(12) United States Patent
Preuß

(10) Patent No.: US 11,162,568 B2
(45) Date of Patent: Nov. 2, 2021

(54) ADJUSTMENT GEARING DEVICE FOR A SHAFT, AND VEHICLE COMPRISING THE ADJUSTMENT GEARING DEVICE

(71) Applicant: Schaeffler Technologies AG & Co. KG, Herzogenaurach (DE)

(72) Inventor: Tobias Preuß, Erlangen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 191 days.

(21) Appl. No.: 16/462,659

(22) PCT Filed: Nov. 7, 2017

(86) PCT No.: PCT/DE2017/100947
§ 371 (c)(1),
(2) Date: May 21, 2019

(87) PCT Pub. No.: WO2018/095464
PCT Pub. Date: May 31, 2018

(65) Prior Publication Data
US 2020/0063847 A1    Feb. 27, 2020

(30) Foreign Application Priority Data
Nov. 25, 2016  (DE) .......................... 102016223474.9

(51) Int. Cl.
*F16H 49/00* (2006.01)
*F01L 1/344* (2006.01)
(Continued)

(52) U.S. Cl.
CPC ............ *F16H 49/001* (2013.01); *F01L 1/344* (2013.01); *H02K 7/116* (2013.01); *F01L 2001/3521* (2013.01); *F16H 2049/003* (2013.01)

(58) Field of Classification Search
CPC ...................................................... F16H 41/001
(Continued)

(56) References Cited

U.S. PATENT DOCUMENTS

| 3,182,525 A | 5/1965 | Tinder et al. |
| 4,096,766 A * | 6/1978 | Pardo ........................ B25J 9/08 |
| | | 414/1 |

(Continued)

FOREIGN PATENT DOCUMENTS

| CN | 1671950 A | 9/2005 |
| CN | 101561031 A | 10/2009 |

(Continued)

*Primary Examiner* — Ha Dinh Ho

(57) ABSTRACT

The disclosure relates to an adjustment gearing device for a shaft, comprising a strain wave gearing. The strain wave gearing has a spur gear device and an inner rotor, and the spur gear device has a first cylindrical section and a collar section. The first cylindrical section has a first diameter, and an outer toothing, and the inner rotor has an inner toothing, said outer toothing and inner toothing meshing together at least in some regions. The adjustment gearing device also comprises an outer rotor, said inner rotor being rotatable in a rotational direction relative to the outer rotor. The spur gear device is rotationally fixed to the outer rotor, and has a second cylindrical section for contacting the outer rotor. The second cylindrical section has a second diameter, and the second diameter is larger than the first diameter.

17 Claims, 1 Drawing Sheet

(51) Int. Cl.
*H02K 7/116* (2006.01)
*F01L 1/352* (2006.01)

(58) Field of Classification Search
USPC .......................................................... 74/640
See application file for complete search history.

(56) References Cited

U.S. PATENT DOCUMENTS

| | | | | |
|---|---|---|---|---|
| 4,770,059 | A * | 9/1988 | Beyer | F16H 49/001 74/640 |
| 5,775,178 | A * | 7/1998 | Asawa | F16H 49/001 74/640 |
| 6,302,073 | B1 | 10/2001 | Heer | |
| 8,991,282 | B2 * | 3/2015 | Yajima | F16H 49/001 74/640 |
| 9,140,350 | B2 * | 9/2015 | Kobayashi | F16H 49/001 |

FOREIGN PATENT DOCUMENTS

| | | |
|---|---|---|
| CN | 204775440 U | 11/2015 |
| CN | 105612316 A | 5/2016 |
| DE | 69519423 T2 | 6/2001 |
| DE | 102005020305 A1 | 11/2006 |
| DE | 102008045013 A1 | 3/2010 |
| DE | 102011004077 A1 | 8/2012 |
| DE | 102013216183 A1 | 2/2015 |
| EP | 2194241 A1 | 6/2010 |
| WO | 2012103786 A1 | 8/2012 |

\* cited by examiner

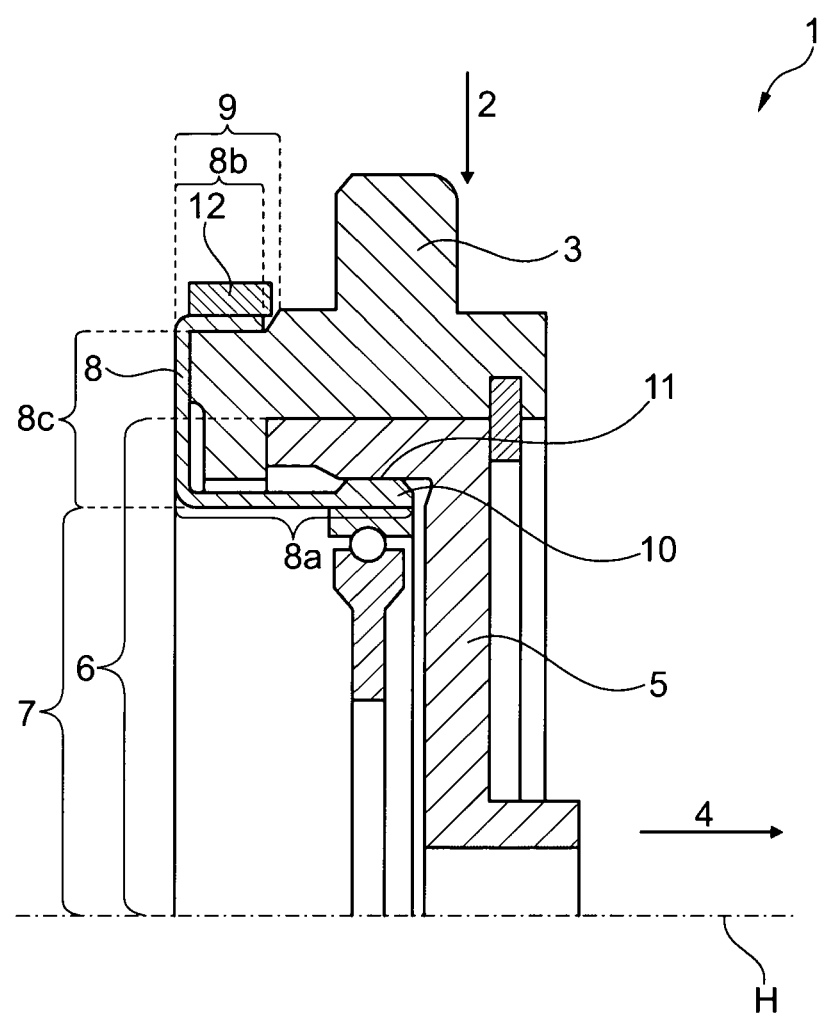

US 11,162,568 B2

ADJUSTMENT GEARING DEVICE FOR A SHAFT, AND VEHICLE COMPRISING THE ADJUSTMENT GEARING DEVICE

CROSS REFERENCE TO RELATED APPLICATIONS

This application is the U.S. National Phase of PCT Application No. PCT/DE2017/100947 filed Nov. 7, 2017 which claims priority to DE 10 2016 223 474.9 filed Nov. 25, 2016, the entire disclosures of which are incorporated by reference herein.

TECHNICAL FIELD

The present disclosure relates to an adjustment gearing device for a shaft having the features described herein. The disclosure further relates to a vehicle comprising the adjustment gearing device.

BACKGROUND

Strain wave gearings are speed-change or transmission mechanisms which are built up from three sub-assemblies. A wave generator device often forms an input or an output in the strain wave gearing and comprises an oval or elliptically-shaped radially outer circumferential surface. This meshes in a second sub-assembly in the form of a component, generally referred to as a flexspline, which is of elastic design such that it can be deformed in a radial direction by the wave generator device. An external toothing is arranged on the radially outer side of the flexspline. As third sub-assembly, the strain wave gearing comprises an internal gear, which carries an internal toothing. The external toothing of the flexspline usually meshes in the internal toothing of the internal gear at two opposing positions. A rotational movement of the wave generator device causes the meshing positions between external toothing and internal toothing to move in a circumferential direction. Due to a difference in the number of teeth between the external toothing and the internal toothing, a relative movement occurs between the wave generator and the flexspline. Features often characteristic of strain wave gearing are a high transmission ratio and a very compact design.

The publication DE 695 194 23 T2, which probably forms the closest pertinent prior art, discloses a top hat-shaped gear device with flexible meshing engagement, comprising: an annular, rigid gear wheel with internal toothing, a deformable gear wheel with external toothing, which is arranged inside the rigid gear wheel with internal toothing, and a wave generator, which is arranged inside the deformable gear wheel with external toothing and deforms the gear wheel with external toothing in a radial direction, in order to bring this, in parts, into meshing engagement with the rigid gear wheel with internal toothing, and in order to rotate an engagement position between these gear wheels in a circumferential direction, wherein the deformable gear wheel with external toothing comprises a cylindrical body, which on its outside at the one open end is provided with external teeth, an annular diaphragm, the inner edge of which is continuous with the other open end of the body, and an annular hub, which is formed continuously with an outer edge of the diaphragm, and wherein the end of the body of the deformable gear wheel with external toothing is provided on the diaphragm side with a curved area, which is bent at right-angles to an axis of the device, allowing it to continue smoothly into the inner edge of the diaphragm. The hub serves for attaching the device to another object, so that the body and the diaphragm are protruding from the hub.

Further strain wave gearings follow from DE 10 2013 216 183 A1, DE 10 2005 020 305 A1, U.S. Pat. No. 3,182,525 A1 and WO 2012/103 786 A1. DE 10 2008 045 013 A1 shows strain wave gearing having a plastic housing part, in which an intermediate annular gear is integrally connected to a housing base and comprises snap-on connections.

SUMMARY

The object of the disclosure is to propose an adjustment gearing device for a shaft which is of compact design.

This object is achieved by an adjustment gearing device and a vehicle comprising the adjustment gearing device, as described herein. Advantageous embodiments of the disclosure are also captured in the following description and/or the figures attached.

The subject of the disclosure is an adjustment gearing device, which is suitable and/or designed for adjusting an angular position and/or phase position of a shaft. The adjustment gearing device serves, in particular, for adjusting a shaft in a vehicle, especially in the engine of the vehicle. The shaft can take the form of a camshaft, such as an inlet camshaft and/or an exhaust camshaft, or a crankshaft. The phase position between the camshaft and the crankshaft of the engine, in particular, is adjusted by the adjustment gearing device. For this purpose, the adjustment gearing device is connected to the shaft, in particular the camshaft or the crankshaft. Alternatively, the adjustment gearing device may be connected via an intermediate shaft, for example to the camshaft or the crankshaft. In principle the adjustment gearing device may take the form of a hydraulic adjustment gearing device. The adjustment gearing device can take the form of an electrical adjustment gearing device, however. The adjustment gearing device can include a drive unit for this purpose, such as an electric motor.

The adjustment gearing device comprises a strain wave gearing, wherein the strain wave gearing comprises a spur gear device and an inner rotor. In particular, the function of the inner rotor is to adjust the phase position of the camshaft or the crankshaft. The inner rotor can be rotationally fixed to the shaft. In particular, the inner rotor is gear-connected to the drive unit. As an optional addition, the strain wave gearing comprises a wave generator. In alternative usage, the strain wave gearing is referred to as a Harmonic Drive, the spur gear device as a flexspline.

The spur gear device comprises a first cylindrical portion and a collar portion. The first cylindrical portion is, in particular, of elastic design, so that it can sustain elliptical or at least oval deformation, particularly in the normal operation of the strain wave gearing. The first cylindrical portion—at least in the detached and/or unstressed state—can take the form, in particular, of a straight hollow cylindrical portion. The first cylindrical portion can be directly connected to the collar portion and/or directly adjoined to the latter. The collar portion in particular has the shape of a circular disk or annular disk, which is arranged in a radial plane and/or coaxially with a main axis of rotation of the adjustment gearing device. The collar portion can bear on the outer rotor in an axial direction and/or in a circumferential direction.

The first cylindrical portion has a first diameter and an external toothing and the inner rotor an internal toothing, wherein the external toothing and the internal toothing intermesh in some areas. In particular, the external toothing and the internal toothing mesh with one another exclusively in two limited areas, which are arranged offset by 180 degrees about the main axis of rotation. In particular, the external toothing is arranged in the area of a limited axial section of the first cylindrical portion.

The wave generator, which forms an optional part of the strain wave gearing and/or the adjustment gearing device, serves to vary the engagement positions between the external toothing and the internal toothing in the circumferential direction. The number of teeth in the external toothing and the internal toothing are designed to differ, so as to produce a relative rotation between the spur gear device and the inner rotor. The inner rotor can take the form of an internal gear or an output internal gear. The inner rotor may be of one-piece or multipiece design.

The adjustment gearing device comprises an outer rotor, wherein the inner rotor is capable of rotating in a circumferential direction relative to the outer rotor. In principle, the function of the outer rotor is to transmit a rotational movement to the shaft. The outer rotor also has the function of transmitting a rotational movement to the camshaft, so as to control an opening and closing of valves. For this purpose, the outer rotor is gear-connected to the crankshaft, wherein a rotational movement of the crankshaft is transmitted to the outer rotor or to the camshaft, thereby driving the camshaft. In principle, the outer rotor may be connected to the crankshaft via a cogged belt and/or via spur gears. The outer rotor can be connected to the crankshaft by a chain, however, wherein the outer rotor takes the form of a chain sprocket. The outer rotor may be of one-piece or multipiece design. The outer rotor may form a drive or an output of the adjustment gearing device.

The spur gear device is rotationally fixed to the outer rotor. In particular, the outer rotor is releasably or fixedly connected and/or gear-connected to the spur gear device. In particular, the spur gear device has the rough shape of a collared sleeve.

Within the scope of the disclosure, the spur gear device comprises a second cylindrical portion for bearing on the outer rotor. In particular, the function of the second cylindrical portion is to connect the spur gear device to the outer rotor, so that the spur gear device is rotationally fixed to the outer rotor. In particular, the second cylindrical portion takes the form of a further, in particular, straight hollow cylindrical portion.

The second cylindrical portion has a second diameter, wherein the second diameter is greater than the first diameter. In particular, the collar portion takes the form of an annular disk, wherein the first diameter corresponds to the inside diameter of the annular disk and the second diameter to the outside diameter of the annular disk. The difference between the first and the second diameter can be more than 1 cm, sometimes more than 3 cm, or even more than 6 cm. Alternatively or as an optional addition, the difference between the first and the second diameter can be less than 8 cm, in some cases less than 5 cm, or even less than 2 cm.

The collar portion is arranged as an intermediate portion between the first and the second cylindrical portion. In particular, the collar portion connects the first and the second cylindrical portion directly to one another. The two cylindrical portions can directly adjoin the collar portion.

One advantage of the disclosure is that the inventive connection of the spur gear device by way of the second cylindrical portion makes it possible to dispense with additional screw fasteners. Consequently, the overall axial length of the adjustment gearing device, in particular, and hence the overall design space required can be reduced. A further advantage is that the rigidity of the spur gear device is reduced, and the operating performance and the service life of the spur gear device can therefore be increased. The absence of any screw fasteners likewise furthermore serves to reduce the costs of the adjustment gearing device.

In one embodiment the second cylindrical portion rests on a radially outer side of the outer rotor and is rotationally fixed to the outer rotor, so that a relative rotation between the inner rotor and the spur gear device leads to a relative rotation of the outer rotor and the shaft. In particular, a torque path runs from the outer rotor via the spur gear device to the inner rotor and therefore to the shaft. The second cylindrical portion can be connected to the outer rotor in a radial and/or in an axial direction and/or in the circumferential direction by positive interlock and/or non-positively and/or frictionally and/or by a cohesive material joint.

The adjustment gearing device comprises a ring arrangement. In particular, the function of the ring arrangement is to fix the second cylindrical portion rotationally to the outer rotor. For this purpose, the ring arrangement bears on the second cylindrical portion, forming a press-fit connection between the ring arrangement, the second cylindrical portion and the outer rotor. In particular, the ring arrangement in a radial direction and/or in the circumferential direction bears directly on the outer cylindrical surface of the second cylindrical portion. Alternatively, the ring arrangement is in indirect contact with the second cylindrical portion via an intermediate element, for example a rubber ring, etc.

In principle, the ring arrangement may take the form of a ring clamp or a connecting ring or a pressure sleeve or a shrink ring. The ring arrangement can also take the form of a pressure ring, however. In particular, the pressure ring is pushed and pressed on over the outer cylindrical surface of the second cylindrical portion, so that the press-fit connection is formed in a radial direction and/or in the circumferential direction. As an optional addition, the second cylindrical portion on its inner cylindrical surface and/or the outer rotor on its radially outer side may have a surface texturing, such as a knurling or a rough surface, so that a frictional connection, in particular, is improved.

In an alternative or optional, additional embodiment of the disclosure, the second cylindrical portion comprises a toothing on its inner cylindrical surface and/or on its outer cylindrical surface. The toothing takes the form, in particular, of lands or teeth or grooves running axially to the main axis of rotation axial. The toothing can be arranged extending in an axial direction and/or in the circumferential direction over the entire inner cylindrical surface and/or the entire outer cylindrical surface. Alternatively, the toothing is arranged over portions or areas in an axial direction and/or in the circumferential direction on the inner cylindrical surface and/or the outer cylindrical surface.

The outer rotor and/or the ring arrangement form a mating contour with the toothing, so that the second cylindrical portion meshes with the outer rotor and/or the ring element. The toothing serves, in particular, to produce a positive interlock in a radial direction and/or in an axial direction, and also in the circumferential direction.

In one possible embodiment, the second cylindrical portion has the toothing on its inner cylindrical surface, for example, and the outer rotor on its radially outer side in the area of the second cylindrical portion. In assembling it, the spur gear device, in particular the second cylindrical portion having the toothing, is pushed onto the outer rotor, so that the spur gear device is rotationally fixed to the outer rotor by the positive interlock. As an optional addition, the ring arrangement may be pressed onto the second cylindrical portion as an additional safeguard, so as to produce an additional frictional connection and/or non-positive connection.

In one development of the disclosure, the second cylindrical portion, on an axial end area, forms a positive interlock with the outer rotor and/or the ring element. The positive interlock of the axial end area serves, in particular, to prevent removal or detachment of the spur gear device and/or the ring arrangement in an axial direction. The positive interlock is formed, in particular, by deformation of the axial end area, possibly by flanging or notching, etc. The positive interlock can be formed after fitting the spur gear device and, where applicable, the ring arrangement.

The first and the second cylindrical portion are arranged coaxially and/or concentrically with a main axis of rotation of the strain wave gearing, wherein the second cylindrical portion is collinear with the first cylindrical portion in an axial direction. The first and the second cylindrical portion and the collar portion can form a U-shape, particularly when viewed in longitudinal section along the main axis of rotation. The collar portion here forms a base and the two cylindrical portions each form a side arm. The two side arms can be formed with different lengths, wherein the side arm formed by the second cylindrical portion is shorter than the side arm formed by the first cylindrical portion. The second, shorter cylindrical portion serves, in particular, as an engagement surface for the pressure ring.

The term U-shaped is likewise, in particular, taken to mean an angular difference between the base and the two side arms of more than 5°, especially more than 15°. Alternatively, or as an optional addition, the angular difference is, in particular, less than 20°, especially less than 10°. However, the two side arms or the two cylindrical portions can be oriented precisely parallel to one another.

In a concrete design embodiment, the two cylindrical portions and the collar portion are integrally connected to one another. In particular, the spur gear device is produced from a steel alloy. The spur gear device can be formed by primary forming and/or by deformation. For example, the spur gear device and the two cylindrical portions and the collar portion are produced by tensile-compressive forming or from a casting.

In a further concrete embodiment, the spur gear device takes the form of a collared sleeve, wherein the second cylindrical portion is formed by deformation of the collar portion. In particular, the second cylindrical portion is formed by bending off the edge in the circumferential direction. The second cylindrical portion can be formed by tensile-compressive forming and/or by bending.

In a further concrete embodiment, the adjustment gearing device is designed for varying the compression ratio of a reciprocating piston engine or for varying the phase position between a camshaft and a crankshaft. The adjustment gearing device is designed, in particular, as a camshaft adjuster or as a compression adjuster. The camshaft adjuster serves, in particular, for adjusting the phase position of the camshaft, such as an inlet and/or an exhaust camshaft, relative to the phase position of the crankshaft of the vehicle. The camshaft adjuster is, in particular, an electrical or an electro-mechanical camshaft adjuster. The camshaft adjuster is, in particular, a VCT system. The compression adjuster serves, in particular, for varying a compression ratio of a reciprocating piston engine. The compression adjuster is, in particular, an electrical or an electro-mechanical compression adjuster. The compression adjuster is, in particular, a VCR system.

A vehicle comprising the adjustment gearing device as previously described forms a further subject of the disclosure.

BRIEF DESCRIPTION OF THE DRAWINGS

Further features, advantages and effects of the disclosure emerge from the following description of an exemplary embodiment of the disclosure and the figures attached, of which:

FIG. 1 in a longitudinal section shows a detail of an adjustment gearing device as an exemplary embodiment of the disclosure.

DETAILED DESCRIPTION OF THE EMBODIMENTS

Corresponding or identical parts are provided with the same reference numerals in each of the figures.

FIG. 1 in a longitudinal section shows a detail of an adjustment gearing device 1. The adjustment gearing device 1 serves for adjusting the phase position of a camshaft of a combustion engine relative to the phase position of a crankshaft of the combustion engine. The adjustment gearing device 1 is arranged in the transmission in series between the crankshaft and the camshaft.

The adjustment gearing device 1 comprises a drive 2, which takes the form of an outer rotor 3, for example a chain sprocket, and an output 4, which takes the form of a shaft, for example, an inlet or an exhaust camshaft, which is coupled, rotationally fixed to an inner rotor 5, for example, a driven internal gear. For example, the drive 2 is gear-connected to the crankshaft, the output 4 is gear-connected to the camshaft, for example, or is formed by the camshaft. The camshaft may be arranged coaxially with the inner rotor 5, for example.

The adjustment gearing device 1 comprises a strain wave gearing 6, in order to produce a relative rotation between the drive 2 and the output 4, in order to vary the phase position between the crankshaft and the camshaft. The strain wave gearing 6 is formed by a wave generator 7, the inner rotor 5 and a spur gear device 8. The strain wave gearing 6 is also referred to as a Harmonic Drive.

In axial top view, the wave generator 7 has an elliptical shape and can be set in rotation by a drive device (not shown), for example, an electric motor. The spur gear device 8 comprises a first and a second cylindrical portion 8a, b and a collar portion 8c. In an unstressed and/or detached state the first and/or the second cylindrical portion 8a, b each take the form of a circular hollow cylinder or sleeve. The first and the second cylindrical portion 8a, b are arranged coaxially and/or concentrically with one another relative to the main axis of rotation H. The two cylindrical portions 8a, b here have different diameters, wherein the diameter of the first cylindrical portion 8a is smaller than the diameter of the second cylindrical portion 8b.

In its basic shape the collar portion 8c takes the form of an annular disk and extends in a radial plane relative to the main axis of rotation H. The collar portion 8c connects the two cylindrical portions 8a, b directly to one another, wherein the two cylindrical portions 8a, b extend in the same direction, for example, at right-angles to the collar portion 8c, in an axial direction relative to the main axis H and/or directly adjoin the collar portion 8c. The collar portion 8c may have tangentially and/or radially oriented openings in order to reduce the flexural rigidity in this portion. This can serve to reduce the stresses of the spur gear device 8 occurring in this area. For example, the openings are arranged uniformly spaced at a distance from one another in the circumferential direction relative to the main axis H.

The spur gear device 8 takes the form, for example, of a collared sleeve, wherein the second cylindrical portion 8b is formed by deformation of the collar. The second cylindrical portion 8b is shorter in its axial extent than the first cylindrical portion 8a. The second cylindrical portion 8b, for example, has a axial length of more than 5 mm, but potentially less than 20 mm.

The outer rotor 3 comprises a receiving portion 9 for receiving the second cylindrical portion 8b. In particular, the receiving portion 9 may take the form of an offset or step, running in the circumferential direction, in an edge area of the outer rotor 3. In a radial direction and in the circumferential direction relative to the main axis of rotation H, the second cylindrical portion 8b rests with its inner cylindrical surface on the receiving portion 9. In an axial direction relative to the main axis H, the collar portion 8c bears on the outer rotor 3, and/or the second cylindrical portion 8b on the receiving portion 9.

On an axial end area, the first cylindrical portion 8a comprises an external toothing 10 and is of elastic and/or flexible design in this area. The wave generator 7 comes into contact with the first cylindrical portion 8a in the area the external toothing 10 on the radially inner side.

The inner rotor 5 comprises an internal toothing 11, which meshes with the external toothing 10 in two areas of engagement. The numbers of teeth in the external toothing 10 and the internal toothing 11 differ, so that running out of the areas of engagement in the circumferential direction about a main axis of rotation H of the adjustment gearing device 1 leads to a relative rotation between inner rotor 5 and spur gear device 8.

The adjustment gearing device 1 comprises a ring arrangement 12. The ring arrangement 12 is pressed onto the second cylindrical portion 8b, wherein a press-fit connection is formed between the ring arrangement 12, the second cylindrical portion 8b and the outer rotor 3. The second cylindrical portion 8b is therefore connected to the outer rotor 3 and the ring arrangement 12 in a radial direction and/or in the circumferential direction, relative to the main axis of rotation H, frictionally and/or non-positively and/or by positive interlock, so that a relative rotation between the inner rotor 5 and the spur gear device 8 leads to a relative rotation of the outer rotor 3 and the shaft. For this to happen, a torque path runs from the outer rotor 3 via the spur gear device 8 to the inner rotor 5 and consequently to the shaft.

For example, the second cylindrical portion 8b may have a surface texturing, for example knurling, rough surface, teeth etc. on its inner cylindrical surface and/or on its outer cylindrical surface, so that the frictional connection is improved in the circumferential direction, for example.

Alternatively or as an optional addition, the second cylindrical portion 8b may have a toothing on its inner cylindrical surface and/or on its outer cylindrical surface, wherein the ring arrangement 12 and/or the receiving portion 9 form a mating contour and therefore mesh with the second cylindrical portion 8b. It is possible here, for example, for the spur gear device 8 with the second cylindrical portion 8b to be pushed onto the receiving portion 9 in an axial direction relative to the main axis of rotation H, so that via the toothing a positive interlock is formed in the circumferential direction.

LIST OF REFERENCE CHARACTERS

1 adjustment gearing device
2 drive
3 outer rotor
4 output
5 inner rotor
6 strain wave gearing
7 wave generator
8 spur gear device
8a first cylindrical portion
8b second cylindrical portion
8c collar portion
9 receiving portion
10 external toothing
11 internal toothing
12 ring arrangement
H main axis of rotation

The invention claimed is:

1. An adjustment gearing device for a shaft, comprising:
   a ring arrangement;
   a strain wave gearing, including:
      a spur gear device having a first cylindrical portion and a collar portion, the first cylindrical portion having a first diameter and an external toothing,
      an inner rotor having an internal toothing, the external toothing and the internal toothing intermeshing in some areas,
      an outer rotor, and,
      the inner rotor capable of rotating in a circumferential direction relative to the outer rotor, and the spur gear device rotationally fixed to the outer rotor,
      the spur gear device including a second cylindrical portion for bearing on the outer rotor,
      the second cylindrical portion having a second diameter greater than the first diameter,
      the collar portion arranged as an intermediate portion between the first and the second cylindrical portion,
      the ring arrangement bearing on the second cylindrical portion, and,
      a press-fit formed between the ring arrangement, the second cylindrical portion, and the outer rotor, and,
      wherein the adjustment gearing device is configured for varying a compression ratio of a reciprocating piston engine or for varying a phase position between a camshaft and a crankshaft.

2. The adjustment gearing device as claimed in claim 1, wherein the second cylindrical portion rests on a radially outer side of the outer rotor and is rotationally fixed to the outer rotor, and a relative rotation between the inner rotor and the spur gear device leads to a relative rotation of the outer rotor and the shaft.

3. The adjustment gearing device as claimed in claim 1, wherein the second cylindrical portion includes at least one of a first toothing on its inner cylindrical surface or a second toothing on its outer cylindrical surface, and at least one of the outer rotor or the ring arrangement form a mating contour with the first or second toothing, so that the second cylindrical portion meshes with at least one of the outer rotor or the ring arrangement.

4. The adjustment gearing device as claimed in claim 1, wherein an axial end area of the second cylindrical portion forms a positive interlock with at least one of the outer rotor or the ring arrangement.

5. The adjustment gearing device as claimed in claim 1, wherein the first and the second cylindrical portion are arranged coaxially with a main axis of rotation of the strain wave gearing, wherein the second cylindrical portion is collinear with the first cylindrical portion in an axial direction.

6. The adjustment gearing device as claimed in claim 1, wherein the first and second cylindrical portions and the collar portion are integrally connected to one another.

7. The adjustment gearing device as claimed in claim 1, wherein the spur gear device is a collared sleeve, and the second cylindrical portion is formed by deformation of the collar portion.

8. A vehicle comprising the adjustment gearing device as claimed in claim 1.

9. An adjustment gearing device for a shaft, comprising:
a ring arrangement;
a strain wave gearing, including:
   a spur gear device having a first cylindrical portion and a collar portion, the first cylindrical portion having a first diameter and an external toothing,
   an inner rotor having an internal toothing, the external toothing and the internal toothing intermeshing,
   an outer rotor, and,
   the inner rotor capable of rotating in a circumferential direction relative to the outer rotor, and the spur gear device rotationally fixed to the outer rotor,
   the spur gear device including a second cylindrical portion that contacts the outer rotor,
   the second cylindrical portion having a second diameter greater than the first diameter,
   the collar portion arranged as an intermediate portion between the first and the second cylindrical portion,
   the second cylindrical portion rotationally fixed to the outer rotor, and,
   the ring arrangement rotationally fixed to the second cylindrical portion, and,
   wherein the adjustment gearing device is configured for varying a compression ratio of a reciprocating piston engine or for varying a phase position between a camshaft and a crankshaft.

10. The adjustment gearing device of claim 9, wherein surface texturing is applied to at least one of an inner cylindrical surface of the second cylindrical portion or a radially outer side of the outer rotor.

11. The adjustment gearing device of claim 9, wherein the second cylindrical portion is axially locked to at least one of the outer rotor or the ring arrangement.

12. The adjustment gearing device of claim 9, wherein the first cylindrical portion and the second cylindrical portion form a U-shape.

13. The adjustment gearing device of claim 12, wherein the second cylindrical portion is shorter in axial length than the first cylindrical portion.

14. The adjustment gearing device of claim 12, wherein the second cylindrical portion has an axial length ranging from 5 mm to 20 mm.

15. The adjustment gearing device of claim 9, wherein the second cylindrical portion includes at least one of a first toothing on its inner cylindrical surface or a second toothing on its outer cylindrical surface, and at least one of the outer rotor or the ring arrangement form a mating contour with the first or second toothing.

16. The adjustment gearing device of claim 9, wherein the external toothing and the internal toothing mesh together in two areas that are offset by 180 degrees about an axis of rotation.

17. The adjustment gearing device of claim 9, wherein a difference between the first diameter and the second diameter is less than 8 cm.

* * * * *